(12) United States Patent
Mizhar

(10) Patent No.: US 10,110,606 B2
(45) Date of Patent: Oct. 23, 2018

(54) REVERSE ACCESS METHOD FOR SECURING FRONT-END APPLICATIONS AND OTHERS

(71) Applicant: SAFE-T DATA A.R LTD., Herzliya Pituach (IL)

(72) Inventor: Amir Mizhar, Modiin (IL)

(73) Assignee: SAFE-T DATA A.R LTD., Herzliya Pituach (IL)

( * ) Notice: Subject to any disclaimer, the term of this patent is extended or adjusted under 35 U.S.C. 154(b) by 0 days.

(21) Appl. No.: 15/896,819

(22) Filed: Feb. 14, 2018

(65) Prior Publication Data

US 2018/0176225 A1 Jun. 21, 2018

Related U.S. Application Data

(63) Continuation of application No. 14/379,305, filed as application No. PCT/IL2013/000017 on Feb. 13, 2013, now Pat. No. 9,935,958.

(30) Foreign Application Priority Data

Feb. 19, 2012 (IL) .......................................... 218185

(51) Int. Cl.
*H04L 29/06* (2006.01)
*G06F 21/60* (2013.01)

(52) U.S. Cl.
CPC .............. *H04L 63/10* (2013.01); *G06F 21/60* (2013.01); *H04L 63/029* (2013.01); *H04L 63/0209* (2013.01)

(58) Field of Classification Search
CPC ... H04L 63/10; H04L 63/0209; H04L 63/029; G06F 21/60
See application file for complete search history.

(56) References Cited

U.S. PATENT DOCUMENTS 6,470,386 B1 10/2002 Combar et al.
7,181,493 B2 2/2007 English et al.
(Continued)

FOREIGN PATENT DOCUMENTS

| CN | 1731786 A | 2/2006 |
| EP | 1324565 A1 | 7/2003 |
| EP | 2031817 A1 | 3/2009 |

OTHER PUBLICATIONS

Fourth Office Action for Chinese Patent Application No. 2013800207104, SIPO, dated Nov. 28, 2017.
(Continued)

*Primary Examiner* — Robert Leung
*Assistant Examiner* — Thomas Ho
(74) *Attorney, Agent, or Firm* — M&B IP Analysts, LLC.

(57) ABSTRACT

A system and method for providing a secured connection between servers on a local area network (LAN) and clients on a wide area network (WAN) via a de-militarized zone (DMZ). The system includes a Service, a LAN Server, a LAN Controller, a DMZ Server and a DMZ Stack Pool Service. The method includes establishing an outbound TCP-based connection to the DMZ Stack Pool Service based on a request; passing Client Connection Information to the LAN Server; generating a first connection to the Service and a second connection to the DMZ Server, wherein the LAN server creates a Connection Binder between the Service and the outbound connections; creating a Connection Binder that binds the incoming Request and the outbound connection to complete the route of the Request; streaming the Request through the DMZ Server and the LAN Server; and streaming the request data from the Service to the Client.

3 Claims, 1 Drawing Sheet

(56) References Cited

U.S. PATENT DOCUMENTS

| | | | |
|---|---|---|---|
| 7,707,628 B2 | 4/2010 | Saito | |
| 8,479,275 B1* | 7/2013 | Naseh | H04L 63/0209 726/11 |
| 2003/0123483 A1* | 7/2003 | Donatelli | H04L 29/06 709/229 |
| 2003/0204613 A1 | 10/2003 | Hudson et al. | |
| 2005/0240994 A1 | 10/2005 | Burcham et al. | |
| 2005/0251855 A1* | 11/2005 | Brandstatter | H04L 63/0209 726/12 |
| 2006/0031929 A1* | 2/2006 | Saito | H04L 63/0209 726/11 |
| 2006/0200547 A1* | 9/2006 | Edwards | H04L 41/28 709/224 |
| 2007/0050843 A1 | 3/2007 | Manville et al. | |
| 2007/0143837 A1* | 6/2007 | Azeez | H04L 63/0209 726/11 |
| 2009/0064307 A1* | 3/2009 | Holar | H04L 63/0209 726/12 |
| 2010/0131616 A1* | 5/2010 | Walter | H04L 63/0209 709/219 |
| 2011/0067107 A1* | 3/2011 | Weeks | G06F 21/55 726/23 |
| 2014/0282999 A1* | 9/2014 | Iwanski | H04L 63/02 726/12 |

OTHER PUBLICATIONS

TCP/IP Networking an Example, May 25th, 2002, CS 458 Slides, University of Virginia, pp. 1-12.
The First Office Action for Chinese Application No. 201380020710. 4, SIPO, dated Sep. 21, 2016.
The First Office Action from the Israel Patent Office for Israeli Patent Application No. 218185 dated Jul. 12, 2015.
The International Preliminary Report on Patentability for PCT/IL2013/000017, WIPO, Switzerland, dated Aug. 28, 2014.
The International Search Report and the Written Opinion for PCT/IL2013/000017, ISA, Jerusalem, Israel, dated Jul. 1, 2013.
The Second Office Action for Chinese Application No. 201380020710. 4, SIPO, dated Feb. 21, 2017.
The Second Office Action from the Israel Patent Office for Israeli Patent Application No. 218185 dated Jun. 4, 2017.
The Third Office Action for Chinese Application No. 201380020710. 4, SIPO, dated Jun. 13, 2017.
Fifth Office Action for Chinese Patent Application No. 2013800207104, SIPO, dated Aug. 15, 2018.
Notice of Decision of Rejection for Chinese Patent Application No. 201380020710.4 dated Apr. 11, 2018, SIPO.

* cited by examiner

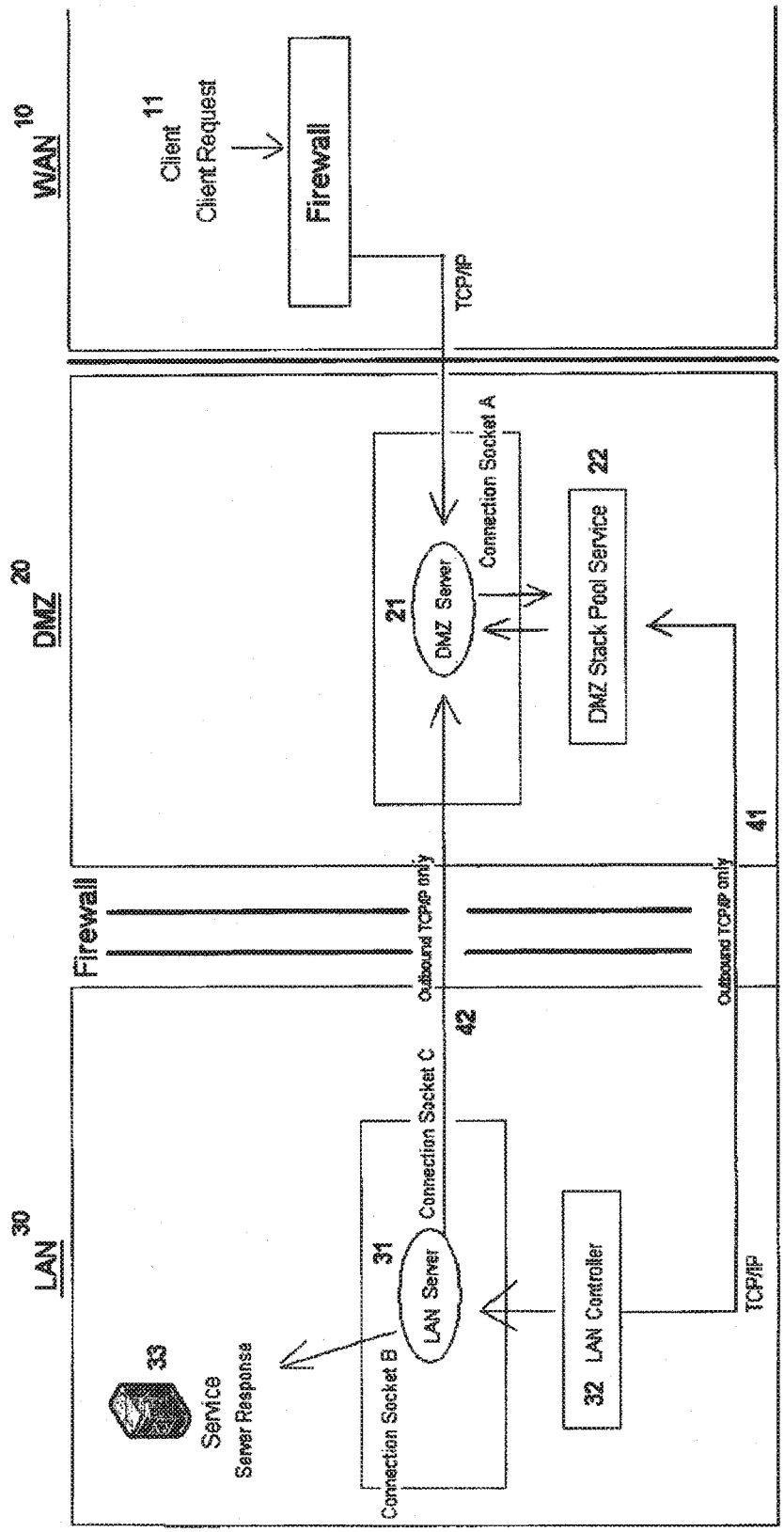

REVERSE ACCESS METHOD FOR SECURING FRONT-END APPLICATIONS AND OTHERS

CROSS-REFERENCE TO RELATED APPLICATIONS

This application is a continuation U.S. patent application Ser. No. 14/379,305 filed on Aug. 18, 2014, now allowed, which is the National Stage of International Application No. PCT/IL2013/000017 having a filing date of Feb. 13, 2013, which claims foreign priority from Israeli Application No. 218185 having a filing date of Feb. 19, 2012. All of the applications referenced above are herein incorporated by reference

DESCRIPTION

The following is an invention for securing electronically stored data, the computer on which the data resides on, and the communications of the computer with its computer network.

BACKGROUND ART

It is a well-known fact that the computers in an organization's internal network (also known as the local area network or LAN) which provide services to users outside of the organization are highly prone to attacks from external hackers and malicious code. Due to this risk, it is a common practice to protect the LAN by placing external-facing computers in a segregated sub-network and thereby shield the rest of the network in case of an attack. This sub-network is commonly known as the DMZ (or De-Militarized Zone). Any computer running programs that provide services to users outside of the organization's internal network can be placed on the DMZ. The most common type of computers are web servers, email servers, FTP servers, and VoIP servers.

Since the DMZ is a sub-network that contains the organization's external services to a larger untrusted network (usually the Internet), potential hackers and malicious code may gain access to the DMZ, but rarely do they gain access to the LAN. The computers on the DMZ have limited connectivity to the computers on the LAN and are usually separated by a firewall that controls the traffic between the DMZ computers and the LAN computers. The DMZ can be seen as an additional layer of security to the LAN.

Organizations that have Internet portals which enable communications with the general public via the Internet are vulnerable to infiltration from the outside. Therefore, many of these organizations establish a DMZ to protect their sensitive data and to reduce the ability of hackers to infiltrate the LAN. The ways and methods under which the DMZ works is known to any expert in the field, and therefore there is no need to describe them here in further detail.

Establishing a DMZ requires the duplication of relevant data and computer programs so they can reside on both the DMZ computers and on the LAN computers. This duplication of data and computer programs has several drawbacks. It can be costly to purchase additional licenses required to install multiple instances of the same computer program on both the LAN and on the DMZ. Supporting and managing duplicate computer programs and data on the LAN and on the DMZ can be costly and difficult. Furthermore, since the DMZ interfaces with the external systems, the data on the DMZ is vulnerable to hacking attacks and external malicious code.

The following invention aims to overcome these disadvantages and to provide an efficient system for protecting the data on the LAN.

DESCRIPTION OF THE DRAWINGS

The intention of the drawings attached to the application is not to limit the scope of the invention and its application. The drawings are intended only to illustrate the invention and they constitute only one of its many possible implementations.

FIG. 1 describes the System that includes the LAN (30) which includes the Service (33), the LAN Server (31) and the LAN Controller (32); The DMZ (20) which includes the DMZ Server (21), the DMZ Stack Pool Service (22); and the WAN (10); and the connections between these components.

DETAILED DESCRIPTION

As described above, there is a strong need for a computer system that enables users to communicate with the LAN and in the same time protects the LAN from external threats. The following invention provides an efficient solution for the issues that are mentioned above.

The present invention provides a System for securing the data and the hosts that reside in the LAN and in the same time enable users to communicate with the LAN in a secured way.

For the sake of clarity and for simplifying the explanation of the System, the following terms are used: WAN: Wide Area Network (10); DMZ: De-Militarized Zone (20); LAN: Local Area Network (30); LAN Server: Server running in the LAN (31); DMZ Server: Server running in the DMZ (21); DMZ Stack Pool Service: Stores and handles Client's Requests (22) in the DMZ; Client Request: HTTP/HTTPS (Web browser)/SSH/SFTP/FTP/FTPS/RDP/SMTP/TLS, and any other TCP/IP based protocols; Client Connection Information: IP-address/Port number of the relevant destination service inside the LAN; LAN Controller: a controller running in the LAN that manages the Client Connection Information (32); Connection Binder: Handshake between two TCP/IP sockets; Service: HTTP/HTTPS (Web Server)/SSH/SFTP/FTP/FTPS/RDP/SMTP/TLS, and any other TCP/IP based services.

The objective of this invention is to provide a secured connection between servers in the LAN and the clients in the WAN.

FIG. 1 describes the main components of the System. The LAN (30) includes the Service (33), the LAN Server (31) and the LAN Controller (32); The DMZ (20) includes the DMZ Server (21), the DMZ Stack Pool Service (22); and the WAN (10) that by its nature includes the clients and the 'outside' world. In addition, FIG. 1 describes the connections between the System components.

The connections between the System components will be described while describing the System flow. The connection flow of the System is as follows:

First step: The Client Request (of the client (11)) reaches the DMZ Server (21).

Second step: The DMZ Server (21) stores the Client Request in the DMZ Stack Pool Service (22).

Third step: The LAN Controller (32) establishes outbound TCP based connection (41) to the DMZ Stack Pool Service (22). One of the innovative aspects of the System is that the LAN Controller (32) constantly, and/or on a predefined set of time basis, checks for Client Requests stored in the DMZ Stack Pool Service (22).

Forth step: The DMZ Stack Pool Service (22) then passes the Client Connection Information, to the LAN Server (31) via the LAN Controller (32).

The Fifth step: The LAN Server (31) then generates two TCP/IP connections: One connection is to the Service (33), which is the destination service, based on the Client Connection Information. The second connection is an outbound connection (42) to the DMZ Server (21). In addition, the LAN Server (31) creates a Connection Binder in the LAN Server between the Service (33) and the outbound connection (42).

The Sixth step: The DMZ Server (21) then creates a Connection Binder in the DMZ Server between the incoming Client Request (that is stored in the DMZ Stack Pool Service (22)) and the outbound connection (42) arriving from the LAN Server (31), and by that completes the route of the Client Request.

Once the Connection Binder, in the DMZ Server, binds the Client Request and the outbound connection (42) arriving from the LAN Server, the Client Request is then streamed through the DMZ Server and the LAN Server over the System, and then the client request data streams from the Service (33) to the Client (11).

In accordance with this invention as described above, no administrative management is required in the LAN Server (31) to establish or maintain communications after it is initially installed and configured on the LAN (30) and on the DMZ (20). The LAN Controller (32) permanently or periodically queries the DMZ Stack Pool Service (22) for incoming Client Requests. The DMZ Server (20) will accept all Client Requests and route them to the LAN Server (31), without changing the data that the Client Requests contains. For example, if a Client Request uses the HTTPS connection protocol, then the HTTPS connection protocol will be transmitted over the System, as with any other common protocols, such as SSH/SFTP/FTP/FTPS/RDP/SMTP/TLS/or any other TCP/IP based protocols.

What is claimed is:

1. A method for providing a secured connection between servers on a local area network (LAN) and clients on a wide area network (WAN) via a de-militarized zone (DMZ), wherein the LAN includes a Service, a LAN Server, and a LAN Controller and the DMZ includes a DMZ Server and a DMZ Stack Pool Service, the method comprising:
   storing a client request reaching the DMZ Server in the DMZ Stack Pool Service;
   establishing, by the LAN Controller, an outbound TCP based connection to the DMZ Stack Pool Service;
   passing Client Connection Information by the DMZ Stack Pool Service to the LAN Server via the LAN Controller;
   generating, by the LAN Server, two TCP/IP connections, a first TCP/IP connection being to the Service and a second TCP/IP being an outbound connection to the DMZ Server, and wherein the LAN server creates a Connection Binder in the LAN Server between the Service and the outbound connections;
   creating, by the DMZ Server, a Connection Binder in the DMZ Server that binds the incoming Client Request and the outbound connection arriving from the LAN Server to complete the route of the Client Request;
   streaming the Client Request through the DMZ Server and the LAN Server; and
   streaming the client request data from the Service to the Client.

2. The method according to claim 1, further comprising checking by the LAN Controller on a regular basis for Client Requests stored in the DMZ Stack Pool Service.

3. The method according to claim 1, further comprising checking by the LAN Controller on a predefined schedule basis for Client Requests stored in the DMZ Stack Pool Service.

* * * * *